United States Patent [19]

Yoshida et al.

[11] Patent Number: 5,166,723
[45] Date of Patent: Nov. 24, 1992

[54] CAMERA SHAKE DETECTING DEVICE

[75] Inventors: Hideo Yoshida; Takashi Kagechika, both of Omiya, Japan

[73] Assignee: Fuji Photo Optical Co., Ltd., Saitama, Japan

[21] Appl. No.: 773,265

[22] Filed: Oct. 9, 1991

[30] Foreign Application Priority Data

Oct. 11, 1990 [JP] Japan .................. 2-272816

[51] Int. Cl.[5] .................................. G03B 7/08
[52] U.S. Cl. .......................... 354/430; 354/403; 354/410
[58] Field of Search ............. 354/410, 430, 70, 403, 354/202

[56] References Cited

U.S. PATENT DOCUMENTS

| 4,462,671 | 7/1984 | Suzuki et al. | 354/430 |
| 4,780,739 | 10/1988 | Kawakami et al. | 354/430 |
| 4,965,619 | 10/1990 | Shikaumi et al. | 354/430 |
| 4,970,540 | 11/1990 | Vasey et al. | 354/202 |
| 5,012,270 | 4/1991 | Sekine et al. | 354/430 |
| 5,101,230 | 3/1992 | Shikaumi et al. | 354/430 |
| 5,117,246 | 5/1992 | Takahashi et al. | 354/430 |

Primary Examiner—Russell E. Adams

[57] ABSTRACT

A camera shake detecting device includes a filter circuit, a variable gain amplifier and a camera shake detection/warning circuit. The filter circuit inputs a receiving output corresponding to a field luminance from a light receiving unit of an active type distance measuring device when the distance measuring device is not conducting a distance measurement, and gives an output, of which higher frequency components than frequency components due to camera shake are attenuated, to the variable gain amplifier. The variable gain amplifier of the gain is controlled corresponding to a mean light volume level of the field so that an amplitude of frequency components due to camera shake is not affected by the field luminance. The camera shake detection/warning circuit inputs an output of the variable gain amplifier, and issues a camera shake warning when the amplitude of frequency components due to camera shake is detected at least while a shutter is opened.

7 Claims, 3 Drawing Sheets

CAMERA SHAKE DETECTING DEVICE

BACKGROUND OF THE INVENTION

The present invention relates to a camera shake detecting device, particularly a camera shake detecting device used for an active type auto-focusing camera.

As a camera shake detecting device, one which provides a vibration detecting device is known. Conventionally, there is provided a vibration detecting device in the camera body for detecting the vibration for an aim to detect camera shake by detecting vibration of the camera itself during a shutter operation.

However, since the conventional camera shake detecting device cannot detect a camera shake unless the camera body itself causes vibration, it is not possible to detect an image blurring in the case where a pictured object moves. Also, a space is required for attaching such a vibration detecting device in the camera body.

SUMMARY OF THE INVENTION

It is an object of the present invention to provide a camera shake detecting device used for an active type auto-focusing camera which can detect image blurring even in the case where a pictured object moves.

Another object of the present invention is to provide a camera shake detecting device used for an active type auto-focusing camera which does not need to have a vibration detecting device or an acceleration sensor attached to the camera body.

Still another object of the present invention is to provide a camera shake detecting device used for an active type auto-focusing camera which can be used under a wide-range luminance condition.

The above objects are attained by a camera shake detecting device to be attached to an active type auto-focusing camera which provides a distance measuring device for measuring a distance to a pictured object by receiving a beam from light projecting means reflected by the pictured object at light receiving means, comprising; filter means for inputting a receiving output which corresponds to field luminance given from said light receiving means, when said distance measuring device fails to perform measurement detections, and for transmitting frequency components due to camera shake in the receiving output without attenuating and for attenuating frequency components higher frequency components due to camera shake; a variable gain amplifier for inputting an output of said filter means; a gain control circuit for inputting the output of said filter means, for detecting a mean light volume level of a field luminance from the output of said filter means, and for controlling a gain of said variable gain amplifier in accordance with the mean light volume level so that an amplitude of the frequency components due to camera shake fail to be affected by brightness of the field; camera shake detection signal output means for inputting an output of said variable gain amplifier, for detecting existence or absence of the amplitude of the frequency components due to camera shake in the output of said variable gain amplifier, and for giving a camera shake detection signal when the amplitude of the frequency components due to camera shake is detected; and camera shake warning means for inputting an output of said camera shake detection signal output means, and for issuing a camera shake warning when the camera shake detection signal is given from said camera shake detection signal output means at least while a shutter is opened.

In the active type auto-focusing camera, the light receiving means is composed so to receive a projected beam from the light projecting means, but the light recurring means also receives a field luminance. In the present invention, when a distance measurement is not done, a camera shake detection is conducted using a receiving output indicative of a field luminance given by the light receiving means. The receiving output indicative of the field luminance given by the light receiving means, when there is no camera shake and consequently no variation in the field luminance, is a fixed level signal matching the field luminance. When a camera shake is caused, a received field luminance varies and the frequency components due to camera shake are superposed to the above-mentioned constant level signal. The filter means transmits the frequency components due to camera shake and attenuate higher frequency components than the frequency components due to camera shake, and then gives the output to the variable gain amplifier and the gain control circuit. The gain control circuit detects the mean light volume level of the field luminance from the output of the filter means, and controls the gain of the variable gain amplifier corresponding to the mean light volume level so that the amplitude of the frequency components due to camera shake are not affected by the brightness of the field. Thus the amplitude variation due to the camera shake is not affected by the brightness of the field, so that it is possible to use the camera under a wide range of luminance conditions.

The camera shake detection signal output means detects the existence or absence of the amplitude of frequency components due to camera shake from the outout of the variable gain amplifier, and gives the camera shake detection signal when the amplitude of frequency components due to camera shake is detected. The camera shake warning means issues the camera shake warning when the camera shake detection signal is given from the camera shake detection signal output means at least while the shutter is opened. Therefore, as it is not necessary to use a vibration detecting device or an acceleration sensor, and as the field luminance varies in proportion with camera shake even when a pictured object moves, image blurring which is caused when the pictured object moves can be detected as well.

BRIEF DESCRIPTION OF THE DRAWINGS

The foregoing objects, features and attendant advantages of the present invention will be appreciated as the same become better understood by means of the following description and accompanying drawings wherein.

DETAILED DESCRIPTION OF THE INVENTION

Figure 1:
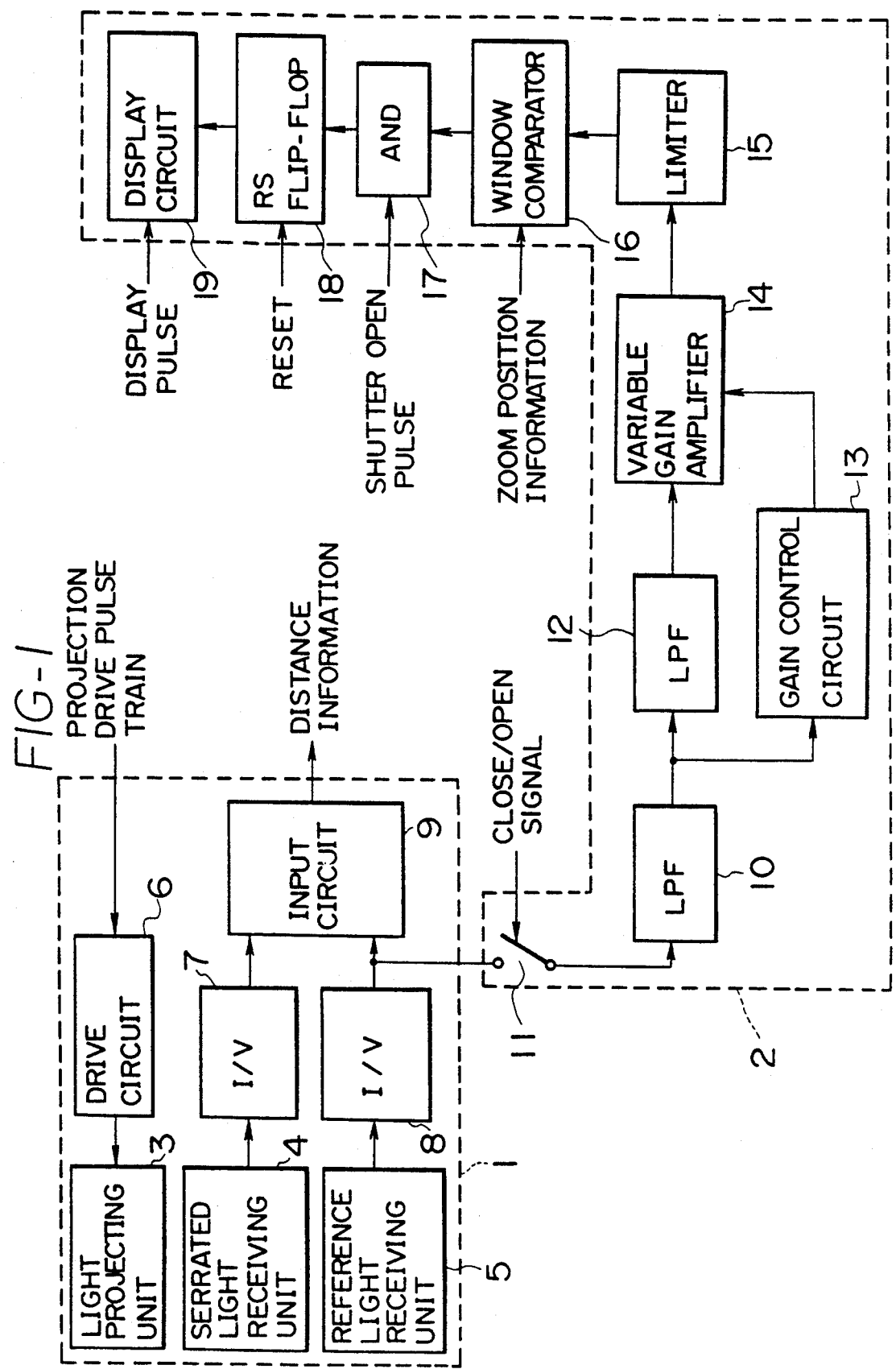
FIG. 1 is a block diagram showing an embodiment of a camera shake detecting device according to the present invention.

In FIG. 1, a reference numeral 1 is an active type distance measuring unit, and a reference numeral 2 is a camera shake detecting device.

Figure 2:
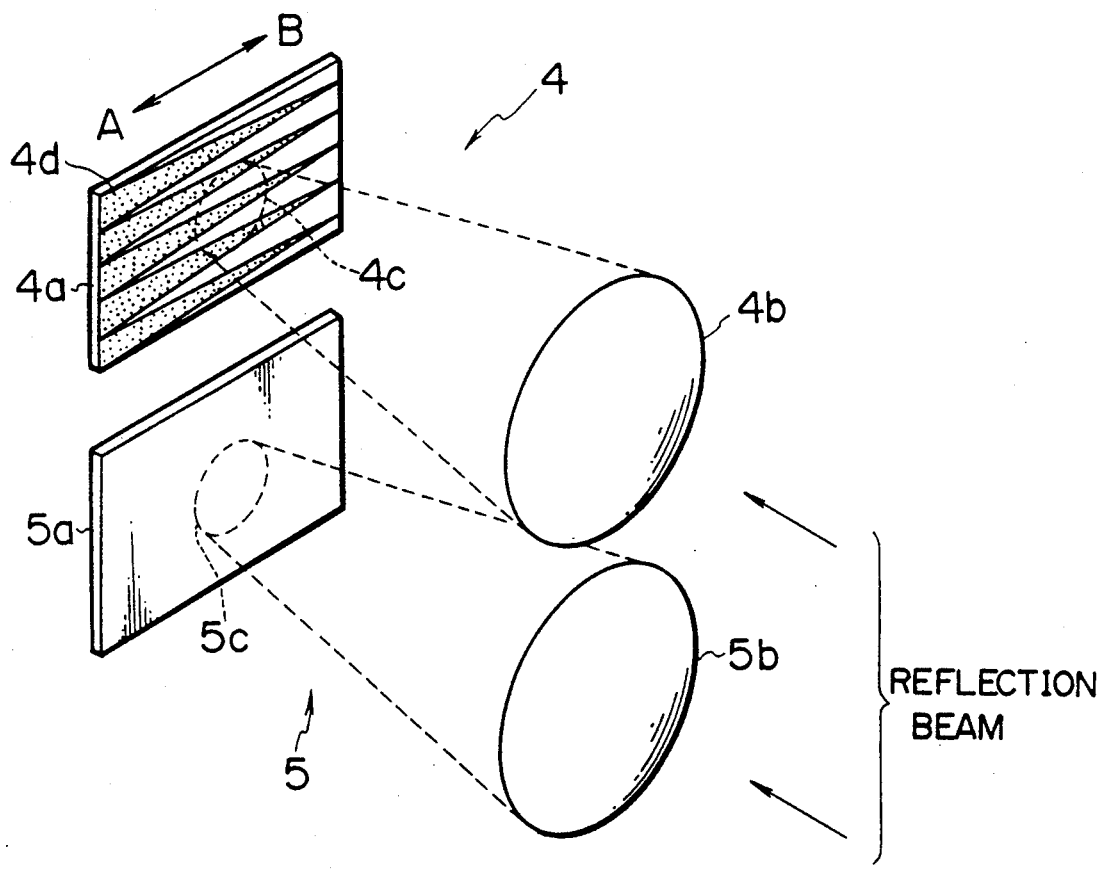
FIG. 2 is a perspective view showing the composition of the serrated light receiving unit and the reference light receiving unit of FIG. 1.

The distance measuring unit 1 has a light projecting unit 3, a serrated light receiving unit 4 and a reference light receiving unit 5. The light projecting unit 3 is pulse-driven by a drive circuit 6 which receives a projection drive pulse train given from a camera CPU (Central Processing Unit) which is not shown in the FIGURE, and projects a near-infrared beam to a pictured object. The camera CPU, as well-known, gives the projection drive pulse train by pushing a first step of a release switch which includes a two-step switch. The serrated light receiving unit 4 and the reference light, receiving unit 5, as shown in FIG. 2, are designed that a photocell 4a of the serrated light receiving unit 4 and a photocell 5a of the reference light receiving unit 5 are arranged at the top and bottom and images 4c and 5c received a reflection beam from a pictured object are given via opposed receiving lenses 4b and 5b to their receiving faces.

On the receiving face of the photocell 4a of the serrated light receiving unit 4, a shading filter 4d is provided, and nothing is provided on the receiving face of the photocell 5a of the reference light receiving unit 5. The received images 4c and 5c respectively of the serrated light receiving unit 4 and the reference light receiving unit 5 are displaced, in the A-B direction of FIG. 2 by of varying the incident angle of reflected beams in response to the distance to the pictured object. Outputs of the serrated light receiving unit 4 and the reference light receiving unit 5 are each given to an input circuit 9 through current/voltage converting amplifiers 7 and 8, respectively. As the light receiving units 4 and 5 are affected by a field luminance, the input circuit 9 cancels the influence of the field luminance from the output of the serrated light receiving unit 4 using the output of the reference light receiving unit 5, and gives only an information of the distance from the pictured object to the camera CPU (not shown). As a result, the distance to the pictured object is recognized by the camera CPU. Incidentally, the camera CPU ceases to output the projection drive pulse train by receiving reflection beams necessary for obtaining the distance information.

As is clear from the above description, the light receiving units 4 and 5 receive the near-infrared beams from the light projecting unit 3, and the light receiving write 4 and 5 also receive the field luminance. Therefore, the light receiving units 4 and 5, when not receiving the projected beams from the light projecting unit 3, give a receiving output which matches the field luminance. The receiving outputs of the receiving units 4 and 5 indicative of the field luminance are a fixed level signal where no camera shake is caused, because no variation is caused in the received field luminance. When a camera shake is caused, the received field luminance varies and frequency components due to the camera shake are superposed to the fixed level signal. As a result, the receiving outputs of the light receiving units 4 and 5 indicative of the field luminance become a signal which varies up and down from a voltage level with the fixed level signal being a center level. The present inventors have determined that the frequency components due to camera shake are mostly below 20Hz.

A camera shake detecting device 2 has a low-pass filter 10 at an input stage, and inputs an output of the reference light receiving unit 5, which has passed through the current/voltage converting amplifier 8, via a switch 11 to the low-pass filter 10. The switch 11 is closed by a close signal given from the camera CPU after the camera CPU has recognized a distance information from the input circuit 9, and the switch 11 is opened by an open signal given from the camera CPU after or exposure has finished. The low-pass filter 10 transmits frequency components below 20Hz without attenuating, and attenuates frequency components higher than 20Hz. An output of the low-pass filter 10 is given to a low-pass filter 12 and a gain control circuit 13.

The low-pass filter 12 provides the same characteristics as that of the low-pass 10. That is, the low-pass filter 12 transmits the frequency components below 20Hz without attenuating, and attenuates the higher frequency components higher than 20Hz. An output of the low-pass filter 12 is given to a variable gain amplifier 14. The gain control circuit 13 detects a mean light volume level of the field luminance by averaging the output from the low-pass filter 10, and controls a gain of the variable gain amplifier 14 according to the mean light volume level of the field so that an amplitude variation due to camera shake in the receiving output is not affected by brightness of the field. That is, as the amplitude variation due to camera shake is increased when the field is bright and is decreased when the filed is dark, the gain of the variable gain amplifier 14 is decreased in accordance with the brightness of the field when the mean light volume level is high; namely when the field is bright, and the gain of the variable gain amplifier 14 is increased in accordance with the darkness of the field when the mean light volume level is low, namely when the field is dark. As a result, when a camera shake is caused, the amplitude variation due to camera shake, which is output from the variable gain amplifier 14, becomes free from the influence of field luminance. Because of this, it becomes possible to use the camera under a wide range of luminance conditions. Also, as compared with gain control by means of the amplitude variation due to camera shake and not by a light volume level, processing systems for a closed loop control or a time delay are not necessary, and thus it is possible to simplify the circuit configuration.

A reference numeral 15 is a limiter. The limiter 15 inputs the output of the variable gain amplifier 14, and, after removing the higher frequency components higher than 20Hz which are attenuated and reduced in level by the low-pass filters 10 and 12, gives signals lower than 20Hz to a window comparator 16. Noises higher than 20Hz are attenuated by the low-pass filters 10 and 12, and as they are not affected by the brightness of the field because of an automatic gain control by the gain control circuit 13 and the variable gain amplifier 14, these noises become far lower in level than the frequency components below 20Hz due to camera shake and are removed by the limiter 15. As a result, since the noises higher than 20Hz are removed by the limiter 15 even when the field is low in luminance and the gain of the variable gain amplifier 14 is controlled high, the S/N ratio will not be degraded.

The window comparator 16 receives the output of the limiter 15, and against a signal with a larger amplitude than the window width, gives a camera shake detection signal with a high level to an AND gate 17. The window width of the window comparator 16 is variable in three steps, for example, so that the window width is narrowed as a taking lens is zoomed to the long focus side by a zoom position information from the camera CPU which represents the zoom position of the taking lens. In a zoom camera, as an image is magnified when the taking lens is set to the long focus side compared with the case where the lens is set to the short focus side, even a small camera shake causes more influence to a taken picture. Normally, the amplitude of the frequency components due to camera shake varies in proportion to the scale of camera shake. Therefore, when the window width of the window comparator 16 is narrowed as the taking lens is zoomed to the long focus side, it is possible to detect smaller camera shake corresponding to a zooming to the long focus side. As a result, it is possible to expect proper camera shake detection matching for each focus distance. In the case of a two focal length camera which can switch between a standard shot and a telephoto shot, the camera may be designed so that the window width of the window comparator 16 varies in two steps depending on the position of the taking lens, the standard shot position or the telephoto shot position, so that the window width is narrowed in the case of a telephoto shot. Incidentally, for a single focal length camera, the window width may be either set to a fixed width or set selectively by manual operation.

The AND gate 17 inputs a shutter open pulse from the camera CPU together with the output of the window comparator 16. The shutter open pulse is a high level pulse which rises with the shutter opened and falls with the shutter closed, and indicates that the shutter is opened. The AND gate 17 gives the camera shake detection signal to a RS flip-flop 18 as a set input when the window comparator 16 outputs a high level camera shake detection signal while the shutter is opened. The RS flip-flop 18 is designed to be reset with the rise of a pulse given by the on state of the first step of a two-step release switch, before the set input. The RS flip-flop 18 is set by the camera shake detection signal when the camera shake detection signal is output from the window comperator 16 while the shutter is opened, and gives the output to a display circuit 19. The display circuit 19 inputs a display pulse from the camera CPU together with the output of the RS flip-flop 18. The display pulse is given for a prescribed time with the shutter closed. The display circuit 19, when the camera shake detection signal is set to the RS flip-flop 18, drives a LED, provided in a finder to emit light while the display pulse is given.

When the first step of the two-step release switch is pushed in the above-mentioned composition, the light projecting unit 3 is pulse-driven by the projection drive pulse train from the camera CPU, and the reflected beam from the pictured object is received at the serrated light receiving unit 4 and the reference light receiving unit 5. The receiving outputs of the light receiving units 4 and 5 are given to the input circuit 9, and the distance information is given from the input circuit 9 to the camera CPU. As a result, the camera CPU recognizes the distance to the pictured object. When the camera CPU recognizes the distance to the pictured object, the output of light projection drive pulse train is finished already, and the light receiving units 4 and 5 give receiving outputs matching the field luminance.

When the camera CPU recognizes the distance to the pictured object, the switch 11 is closed. Thereby, the receiving output matching the field luminance of the reference light receiving unit 5 is given through the low-pass filters 10 and 12 to the variable gain amplifier 14, and through the low-pass filter 10 to the gain control circuit 13. The noise higher than 20Hz from fluorescent lamps and tungsten lights are attenuated by the low-pass filters 10 and 12. The frequency components below 20Hz are transmitted through the low-pass filters 10 and 12 without attenuating, and are given to the limiter 15 through the variable gain amplifier 14. The gain of the variable gain amplifier 14 is decreased by the gain control circuit 13 when the field is bright, or increased when the field is dark. Accordingly, the amount of variation due to camera shake is not affected by the brightness of the field, and at the same time the amount of variation of noises is not affected by the brightness of the field.

As the noises are attenuated by the low-pass filters 10 and 12 and become free from influence of the brightness of the field, the amplitude becomes smaller than that of frequency components due to camera shake, and are removed by the limiter 15. Therefore, the output of the limiter 15 contains the frequency components below 20Hz only, and these frequency components are given to the window comparator 16. The window comparator 16 varies the window width by a zoom position in response to a zooming operation, and the window width is narrowed toward the long focus side. When the frequency components with an amplitude larger than the window width of the window comparator 16 are generated in the output of the limiter 15 by the camera shake, the high level camera shake detection signal is given from the window comparator 16 to the AND gate 17. The AND gate 17 passes the camera shake detection signal only while the shutter is opened. The RS flip-flop 18 is set by the camera shake detection signal from the AND gate 17. When the RS flip-flop gate 18 is set, an indication of the camera shake while the shutter was opened is displayed on the display circuit 19 according to the display pulse after finishing the exposure.

The above description is directed to a camera shake, but since a field luminance, which the reference light receiving unit 5 receives, varies when the pictured object moves while the shutter is opened, as in the case of camera shake, it is also possible to detect an image blurring due to the movement of the pictured object.

Figure 3:
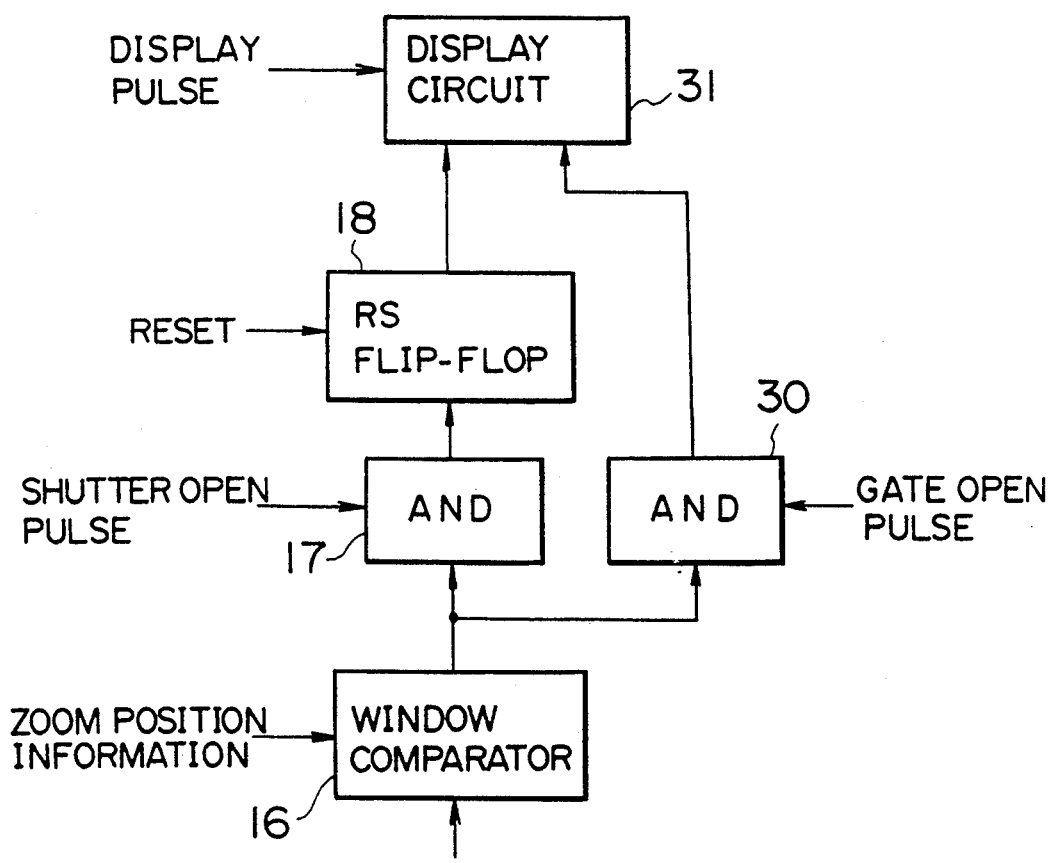
FIG. 3 is a block diagram showing a major part of another embodiment of a camera shake detecting device according to the present invention.

FIG. 3 is a block diagram showing the major parts of another embodiment of a camera shake detecting device according to the present invention. In the embodiment of FIG. 3, in addition to the AND gate 17 and the RS flip-flop 18 in the embodiment of FIG. 1 for detecting camera shake during the shutter open period, an AND gate 30 for inputting a high level gate open pulse from the camera CPU (not shown) and the output of the window comparator 16 is provided. The AND gate 30 gives a camera shake detection signal to the display circuit 31 when the gate open pulse from the camera CPU and the camera shake detection signal from the window comparator 16 are given while a focus lock is applied, namely while the on state of the first step of the two-step release switch is maintained. The display circuit 31 displays a camera shake during the focus lock when the camera shake detection signal is given from the AND gate 30. As a result an evidence of camera shake during the shutter open period is displayed by the display circuit 31 and the camera shake during the focus lock is displayed by the display circuit 31, and a warning against the camera shake is given before the shutter is opened. The gate open pulse is given during the focus lock, namely while the on state of the first step of the two-step release switch is maintained.

The display circuit 31, when there is the camera shake during the shutter open period, displays the evidence of camera shake during the shutter open period by lighting a LED in the finder for a prescribed time after finishing the exposure, according to the display pulse which was described in aforementioned embodiment, and, responding to the camera shake detection signal given through the AND gate 30, lights the above-mentioned LED or another LED which is provided in the finder each time camera shake is caused during the focus lock. Composition and operation of others are as mentioned in the aforementioned embodiment. According to the present embodiment, as the display is given against the camera shake during the focus lock in addition to displaying camera shake in the case of camera shake caused during the shutter open period, it is possible to promote stabilization of a camera preceding each picture taking.

As described in detail, according to the present invention, it is not necessary to use a vibration detecting device or an acceleration sensor, and as the field luminance varies for the case of camera shake even when the pictured object moves, it is also possible to detect the image blurring when the pictured object moves. Moreover, as the amplitude variation of frequency components due to camera shake is not affected by the field luminance according to the present invention, it is possible to use the camera under a wide range of luminance condition.

From the foregoing it will now be apparent that a new and improved camera shake detecting device has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A camera shake detecting device to be attached to an active type auto-focusing camera which provides a distance measuring device for measuring a distance to a pictured object by receiving a beam from light projecting means reflected by the pictured object at light receiving means, comprising:
    filter means for inputting a receiving output which corresponds to field luminance given from said light receiving means, when said distance measuring device fails to perform measurement detections, and for transmitting frequency components due to camera shake in the receiving output without attenuating and for attenuating frequency components higher than the frequency components due to camera shake;
    a variable gain amplifier for inputting an output of said filter means;
    a gain control circuit for inputting the output of said filter means, for detecting a mean light volume level of a field luminance from the output of said filter means, and for controlling a gain of said variable gain amplifier in accordance with the mean light volume level so that an amplitude of the frequency components due to camera shake fail to be affected by brightness of the field;
    camera shake detection signal output means for inputting an output of said variable gain amplifier, for detecting existance or absence of the amplitude of the frequency components due to camera shake in the output of said variable gain amplifier, and for giving a camera shake detecting signal when the amplitude of the frequency components due to camera shake is detected; and
    camera shake warning means for inputting an output of said camera shake detection signal output means, and for issuing a camera shake warning when the camera shake detection signal is given from said camera shake detection signal output means at least while a shutter is opened.

2. The device of claim 1, wherein said filter means includes switching means which is switched on in response to an end of distance measurement and switched off in response to an end of exposure, and said filter means inputs the receiving output of said light receiving means when said switching means is switched on.

3. The device of claim 1, wherein said camera shake detection signal output means includes
    a limiter for inputting the output of said variable gain amplifier and for removing signals with the frequency components higher than the frequency components due to camera shake, and
    a window comparator for inputting an output of said limiter and for giving the camera shake detection signal when the output of said limiter contains signals with an amplitude larger than a window width thereof.

4. The device of claim 3, wherein the window width of said window comparator is varied, according to a focal length of a taking lens, so the window width is narrowed as the taking lens is operated from a short focus side to a long focus side.

5. The device of claim 1, wherein said camera shake warning means includes
    first gate means for inputting the output of said camera shake detection signal output means and for passing the camera shake detection signal when the camera shake detection signal is given from said camera shake detection signal output means while the shutter is opened, and
    first camera shake display means for inputting an output of said first gate means and for displaying, when the camera shake detection signal is given from said first gate means, that a camera shake was caused during the shutter open period at an end of exposure.

6. The device of claim 1, wherein said camera shake warning means issues the camera shake warning when the camera shake detection signal is given from said camera shake detection signal output means while the shutter is opened, and issues a camera shake warning when the camera shake detection signal is given from said camera shake detection signal output means during a focus lock.

7. The device of claim 1, wherein said camera shake warning means includes
    first gate means for inputting the output of said camera shake detection signal output means and for passing the camera shake detection signal when the camera shake detection signal is given from said camera shake detection signal output means during the shutter open period,
    first camera shake display means for inputting an output of said first gate means, and for displaying that a camera shake was caused during the shutter open period, after an end of exposure, when the camera shake detection signal is given from said first gate means,
    second gate means for inputting the output of said camera shake detection signal output means, and for passing the camera shake detection signal when the camera shake detection signal is given from said camera shake detection signal output means during a focus lock, and second camera shake display means for inputting an output of said second gate means, and for displaying, during the focus lock, that a camera shake is caused when the camera shake detection signal is given from said second gate means.

* * * * *